United States Patent [19]

Fallside

[11] Patent Number: 6,115,723
[45] Date of Patent: *Sep. 5, 2000

[54] SYSTEM AND METHOD FOR CONVERTING A COORDINATE BASED DOCUMENT TO A MARKUP LANGUAGE (ML) BASED DOCUMENT

[75] Inventor: David C. Fallside, San Jose, Calif.

[73] Assignee: International Business Machines Corporation, Armonk, N.Y.

[ * ] Notice: This patent is subject to a terminal disclaimer.

[21] Appl. No.: 08/895,453

[22] Filed: Jul. 16, 1997

Related U.S. Application Data

[63] Continuation of application No. 08/422,833, Apr. 17, 1995, abandoned.

[51] Int. Cl.⁷ .................................................. G06F 17/25
[52] U.S. Cl. ........................................ 707/513; 707/523
[58] Field of Search .................................. 395/774, 785; 707/513, 523

[56] References Cited

U.S. PATENT DOCUMENTS

| | | | |
|---|---|---|---|
| 4,751,740 | 6/1988 | Wright | 382/180 |
| 5,173,853 | 12/1992 | Kelly et al. | 364/419 |
| 5,299,304 | 3/1994 | Williams et al. | 395/148 |
| 5,347,625 | 9/1994 | Kajimoto et al. | 395/145 |
| 5,359,673 | 10/1994 | De La Beaujardiere | 382/229 |
| 5,404,294 | 4/1995 | Karnik | 364/419.1 |
| 5,513,311 | 4/1996 | McKiel, Jr. | 395/161 |

OTHER PUBLICATIONS

"WebPublisher", SkiSoft, Inc., http://www.skisoft.com/fag_08.html, Apr. 1995.

McCormick, "Newfor PCs: two CD–ROM publishing tools", Newsbytes, Sep. 16, 1991.

Karney, "TagWrite enforces consistent publishing style", PC Magazine, v. 10, n. 20, p. 58, Nov. 1991.

"Seybold—EBT's SGML tools for end users", Newsbytes, Mar. 29, 1994.

Ulanoff, "Over the (desk) top", PC Magazine, v. 13, n. 9, p. 164(9), May 1994.

Walter et al., "Status report on SGML; notes from SGML '93", The Seybold Report on Publishing Systems, v. 23, n. 9, p. 3(11), Jan. 1994.

Mendelson, "Share and share alike: electronic–document–exchange software", Computer Shopper, v. 15, n. 2, p. 518(10), Feb. 1995.

"SGML tools: Microsoft into the act", The Seybold Report on Publishing Systems, v. 24, n. 4, pS32(6), Oct. 1994.

"Avalanche: seeking structure in Word; validating Word eases transition to structured editing, SGML", The Seybold Report on Publishing Systems, v. 23, n. 18, p. 48, Jun. 1994.

Smith et al., "Corel Draw 5 marks the return of Ventura Publisher", The Seybold Report on Desktop Publishing, v. 8, n. 10, p. 3(8), Jun. 1994.

"Delivery and retrievel technology", The Seybold Report on Publishing Systems, v. 23, n. 16, pS20(16), May 1994.

*Primary Examiner*—Stephen S. Hong
*Attorney, Agent, or Firm*—Sterne, Kessler, Goldstein & Fox P.L.L.C.

[57] ABSTRACT

Converting an electronic representation of a coordinate based document to an electronic representation of a tag based document is described. Objects, defined by records stored in the electronic representation of the coordinate based document, that are positioned in a current line are identified. The identified objects are sorted based on respective horizontal positions (specifically, from left to right) of the identified objects in an electronic canvas. A vertical distance between the current line and an adjacent line is calculated, and an inter-line tag is generated as a function of the distance. The inter-line tag is stored in the electronic representation of the tag based document.

16 Claims, 5 Drawing Sheets

SYSTEM AND METHOD FOR CONVERTING A COORDINATE BASED DOCUMENT TO A MARKUP LANGUAGE (ML) BASED DOCUMENT

This application is a continuation of application Ser. No. 08/422,833, filed Apr. 17, 1995, now abandoned.

TECHNICAL FIELD

The present invention relates generally to visual editors, and more particularly to converting from a coordinate based document (generated by a visual editor) to a markup language (ML) based document.

BACKGROUND ART

A visual editor is a computer-based application that allows users to construct documents and user interfaces of computer programs by placing objects, such as text and buttons, onto electronic canvases that represent pages and windows. The objects that are placed onto a canvas, and their layout on a canvas, may be represented using either of two standard formats: the markup language (ML) format and the coordinate format. There is no direct correspondence between the statements of these two formats.

The ML format (also called the "tag format" herein) represents objects on an electronic canvas as an ordered (i.e., linear, sequential) sequence of statements that contains both definitions of the objects themselves (for example, the text of a textual object), and statements that determine how the objects are to be laid out. ML statements that determine layout are typically expressed in units that are associated with the documents, for example: page, paragraph, line, etc. To illustrate, consider two lines as they may appear on a page:

This is the first line.
This is the second line.

In a document conforming to the ML format, these two lines are stored as follows:

This is the first line.<BR>This is the second line.

The <BR> statement indicates that there is a linebreak between the text preceding it and the text following it. There are different implementations of the ML format, two of which being the Standard General Markup Language (SGML), and another being the Hypertext Markup Language (HTML).

The coordinate format records for each object: (1) the definition of the object; and (2) the {x,y} coordinate position of the object (the position of the object in the electronic canvas). In a document conforming to the coordinate format, the two example lines shown above may be stored as follows (assume that the height of a row is 10 units and the y-coordinate runs from top to bottom):

Text Object 2: text="This is the second line", coordinates={0,20}
Text Object 1: text="This is the first line", coordinates={0, 10}

It is often desirable to generate a ML representation of a document stored in the coordinate format. This coordinate-to-ML translation is difficult because: (i) the ML format depends upon a particular sequence of ML statements, whereas coordinate statements can be recorded in any order; and (ii) the ML format includes layout statements that explicitly define the layout of objects, whereas the coordinate format does not explicitly define layout (instead, layout is implied based on the coordinates of the objects).

Thus, what is required is a system and method for translating a coordinate based document to a ML based document.

DISCLOSURE OF INVENTION

Briefly stated, the present invention is directed to a system and method for converting an electronic representation of a coordinate based document to an electronic representation of a tag based document. The invention operates by identifying objects, defined by records stored in the electronic representation of the coordinate based document, that are positioned in a current line. The identified objects are sorted based on respective horizontal positions (specifically, from left to right) of the identified objects in an electronic canvas. A vertical distance between the current line and an adjacent line is calculated, and an inter-line tag is generated as a function of the distance. The inter-line tag is stored in the electronic representation of the tag based document.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF DRAWINGS

The present invention will be described with reference to the accompanying drawings, wherein.

BEST MODE FOR CARRYING OUT THE INVENTION

Figure 1:
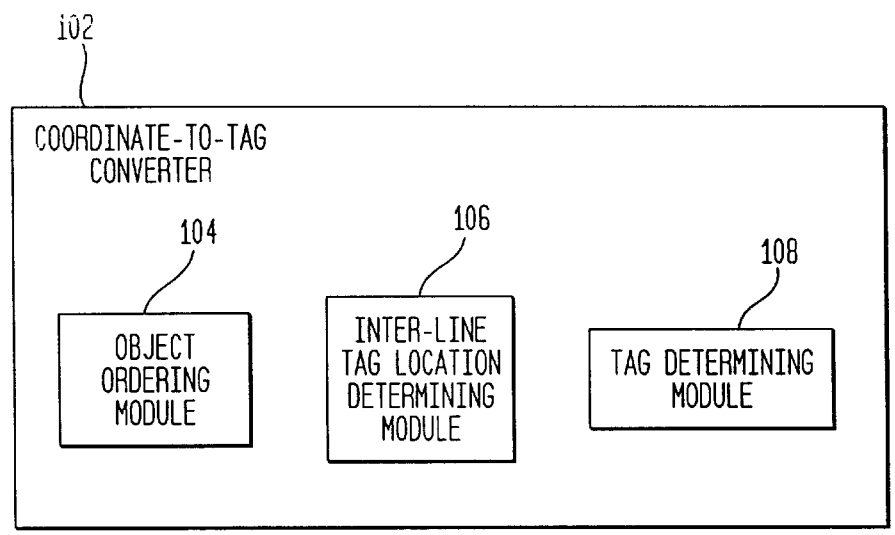
FIG. 1 is a block diagram of a coordinate-to-tag converter according to a preferred embodiment of the present invention.

FIG. 1 is a block diagram of a coordinate-to-tag converter 102 (also called a coordinate-to-ML converter 102) according to a preferred embodiment of the present invention. The converter 102 has three functional modules: an object ordering module 104, an inter-line tag location determining module 106, and a tag determining module 108.

The present invention performs coordinate-to-tag conversion (also called coordinate-to-ML conversion) by (1) ordering objects; (2) indicating where inter-line layout statements should be inserted; and (3) determining the inter-line layout statements that should be inserted into the ML document. More particularly, the object ordering module 104 groups together objects that appear within horizontal lines. Objects are grouped within a particular line if they overlap in the vertical dimension on the electronic canvas. The coordinates of a line are defined as the Y coordinate of the top of the highest object in the line, and the Y coordinate of the bottom of the lowest object. Within a line, objects are ordered from left to right, and any tied objects are ordered from top to bottom.

The inter-line tag location determining module 106 locates inter-line layout statements between the lines defined by the object ordering module 104. The tag determining module 108 determines the particular inter-line layout statements that should be inserted between two lines based on the distance between the bottom of one line and the top of the following line.

(In practice, it is not important whether the functions described herein are performed by the object ordering module 104, the inter-line tag location determining module 106, the tag determining module 108, or some other modules of the coordinate-to-tag converter 102. Accordingly, in the following, all functions are described as being performed by the coordinate-to-tag converter 102.)

Figure 2:
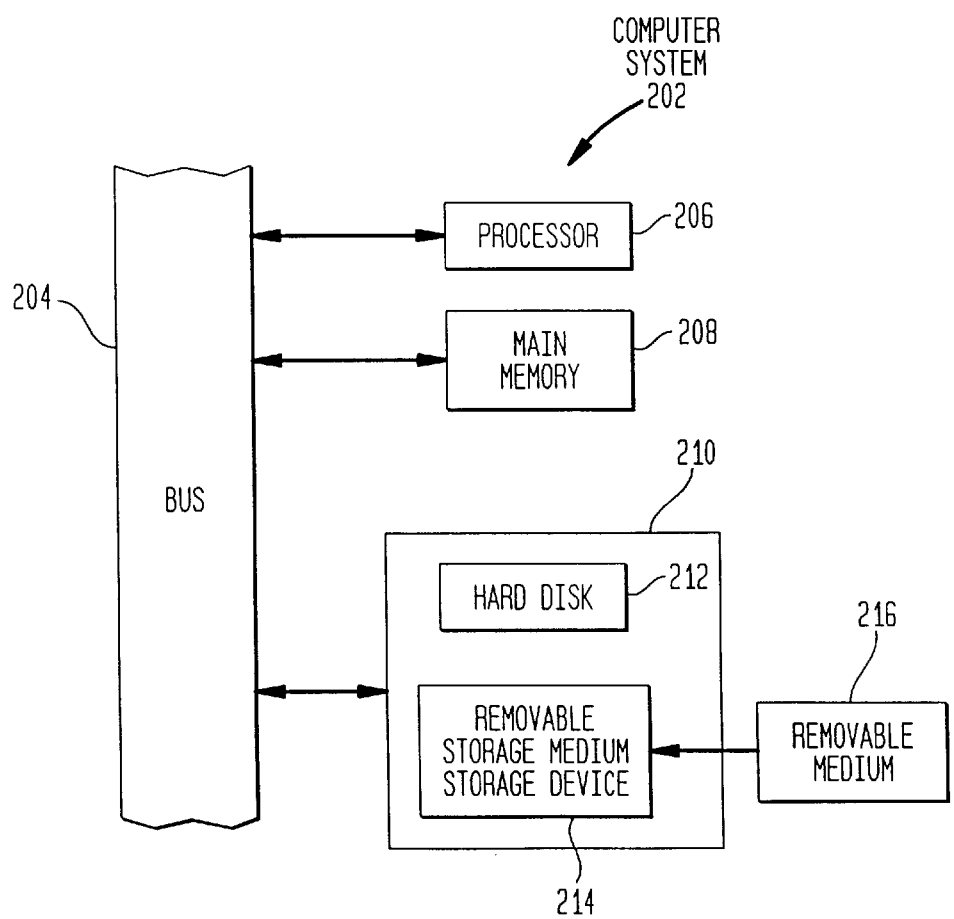
FIG. 2 is a block diagram of a computer system used to implement the present invention.

The coordinate-to-tag converter 102 of the present invention is preferably implemented using a computer system 202 as shown in block diagram form in FIG. 2. The computer system 202 includes one or more processors, such as processor 206, connected to a bus 204. Also connected to the bus 204 is a main memory 208 (preferably random access memory, RAM) and secondary storage devices 210. The secondary storage devices 210 include, for example, a hard drive 212 and a removable storage medium drive 214 (such as a disk drive, for example).

The coordinate-to-tag converter 102 is preferably a computer program that resides in main memory 208 while executing. When executing, this computer program enables the computer system 202 to perform the features of the present invention as discussed herein. Thus, the coordinate-to-tag converter 102 represents a controller of the computer system 202 (and of the processor 206). Alternatively, the coordinate-to-tag converter 102 is a predominately or entirely a hardware device, such as a hardware state machine.

In one embodiment, the present invention is a computer program product (such as removable storage medium 216, representing a computer storage disk, compact disk, etc.) comprising a computer readable media having control logic recorded thereon. The control logic, when loaded into main memory 208 and executed by the processor 206, enables the processor 206 to perform the operations described herein.

Operation of the Invention

Figure 5A:
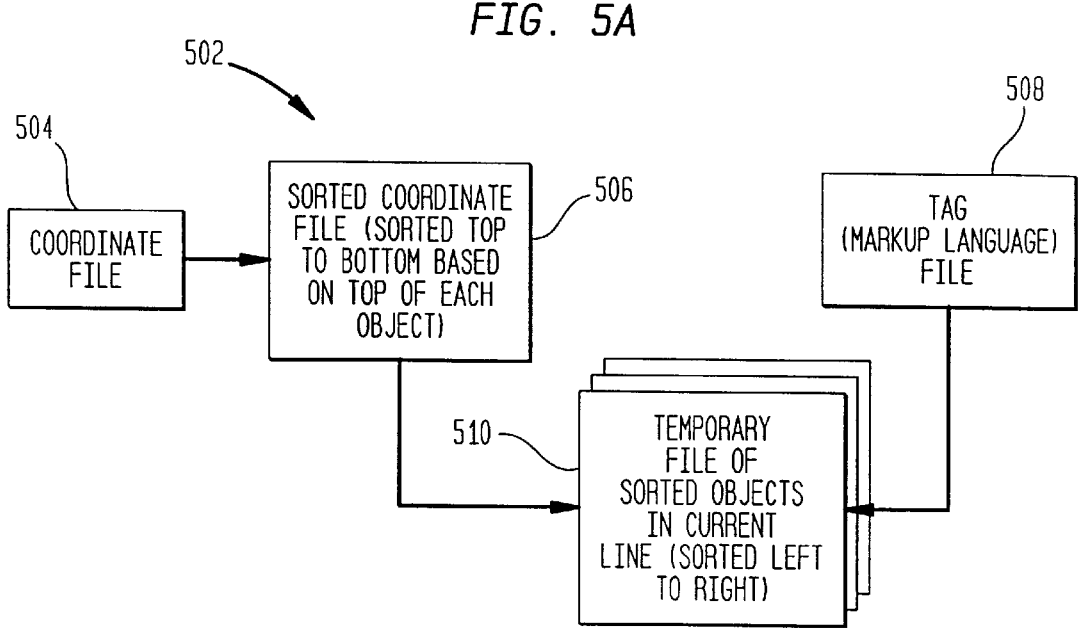
FIG. 5A is a dataflow diagram representative of the operation of the present invention.

FIG. 5A is a dataflow diagram 502 corresponding to the preferred operation of the coordinate-to-tag converter 102. The coordinate-to-tag converter 102 receives a coordinate file 504 that has been previously generated typically by a user using a visual editor. The coordinate file 504 is in a coordinate format. As such, the coordinate file 504 stores a coordinate format record for each object (i.e., text, button, image, etc.) in the electronic canvas. Each coordinate format record specifies: (1) the definition of the object (such as the text of a textual object, and its height on the canvas); and (2) the {x,y} coordinate position of the object (the position of the object in the electronic canvas).

Figure 5B:
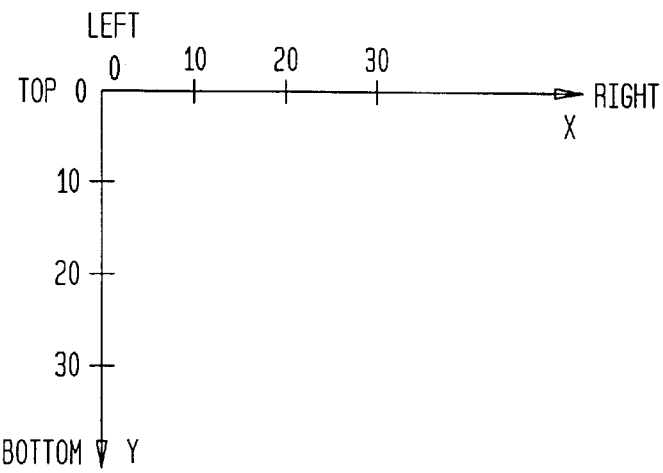
FIG. 5B illustrates a preferred coordinate system for a canvas.
Figure 5C:
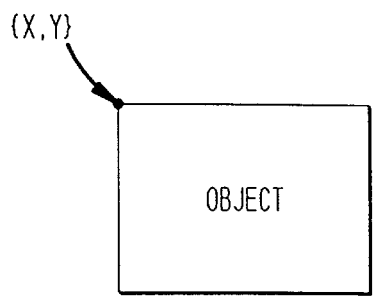
FIG. 5C illustrates a preferred coordinate system for an object.

The coordinate-to-tag converter 102 vertically sorts the objects represented in the coordinate file 504 to thereby generate a sorted coordinate file 506. The objects represented by the coordinate format records stored in the sorted coordinate file 506 are sorted from top to bottom of the electronic canvas. Thus, the first coordinate format record stored in the sorted coordinate file 506 has the smallest Y-coordinate value of all of the coordinate format records in the sorted coordinate file 506 (according to a preferred embodiment of the invention, the top of the canvas corresponds to Y=0, as shown in FIG. 5B; and an object's coordinates correspond to the location of its upper left hand corner, as shown in FIG. 5C). The second coordinate format record stored in the sorted coordinate file 506 has the next smallest Y-coordinate value of all of the coordinate format records in the sorted coordinate file 506. The last coordinate format record stored in the sorted coordinate file 506 has the largest Y-coordinate value of all of the coordinate format records in the sorted coordinate file 506.

The coordinate-to-tag converter 102 converts the sorted coordinate file 506 to a tag (markup language) file 508 via a plurality of temporary files 510. The tag file 508 is in a markup language (ML) format. As such, the tag file 508 stores an ordered (i.e., linear, sequential) sequence of statements. These statements include: (1) an object defining statement for each object in the canvas (these statements define the objects, such as specifying the text of a textual object); and (2) layout statements that specify how the objects are to be laid out.

According to an embodiment of the present invention, the coordinate-to-tag converter 102 generates a plurality of temporary files 510 during the translation of the sorted coordinate file 506 to the tag file 508. Each temporary file 510 stores a sorted sequence of objects in a line (sorted left to right on the canvas). For performance reasons, the sorted coordinate file 506 and the temporary files 510 are not actually "files," but are instead lists of objects that are maintained in program memory (RAM). These objects may be stored in arrays in program memory, for example. For ease of discussion, however, these lists of objects are herein referred to as "files."

Figure 6:
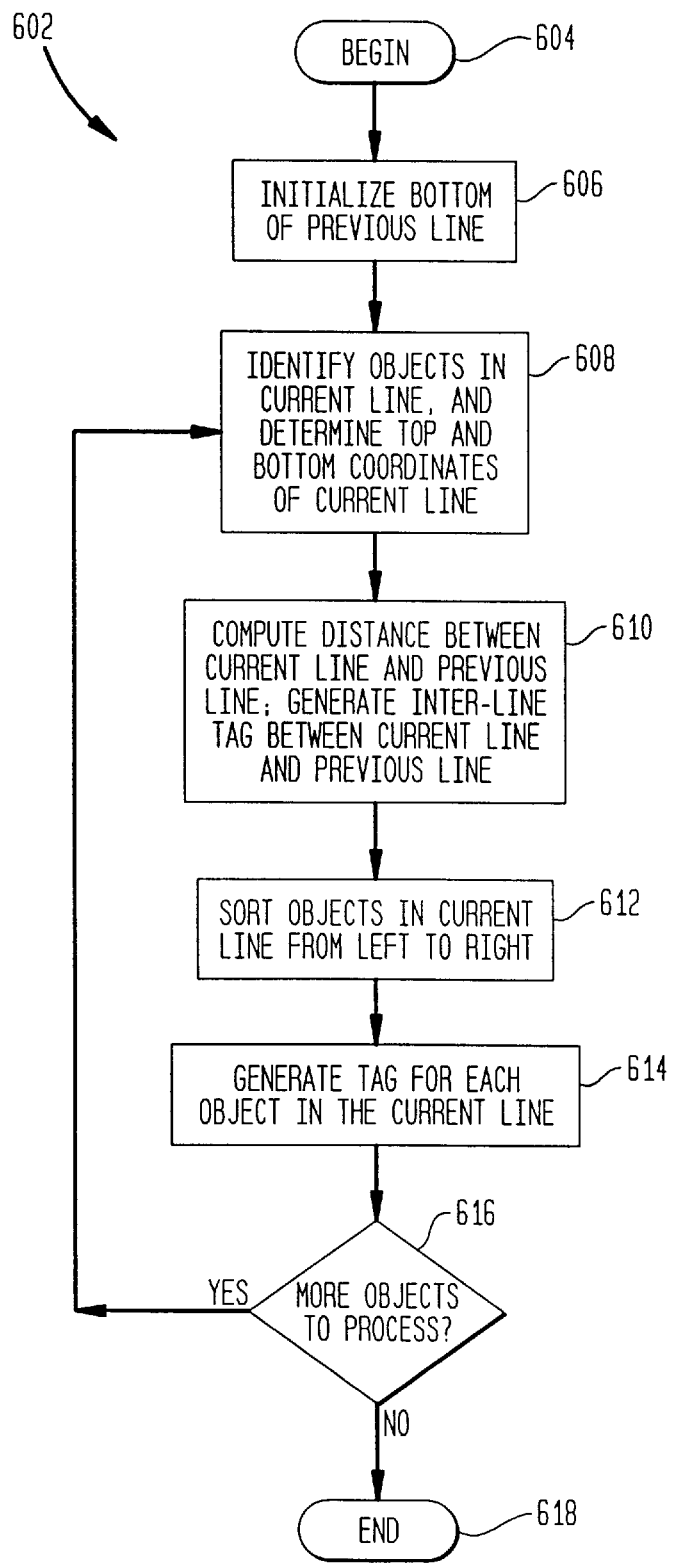
FIGS. 6 and 7 illustrate flowcharts depicting the preferred operation of the present invention.

The preferred operation of the coordinate-to-tag converter 102, including the manner in which the temporary files 510 are generated and used, shall now be discussed in greater detail with reference to a flowchart 602 shown in FIG. 6. Flowchart 602 begins with step 604, where control immediately passes to step 606.

In step 606, the coordinate-to-tag converter 102 initializes a bottom_of_line value for the previous line to be the Y-coordinate corresponding to the top of the canvas. Accordingly, in step 606 the coordinate-to-tag converter 102 initializes the bottom_of_line value for the previous line to be equal to zero.

Figure 7:
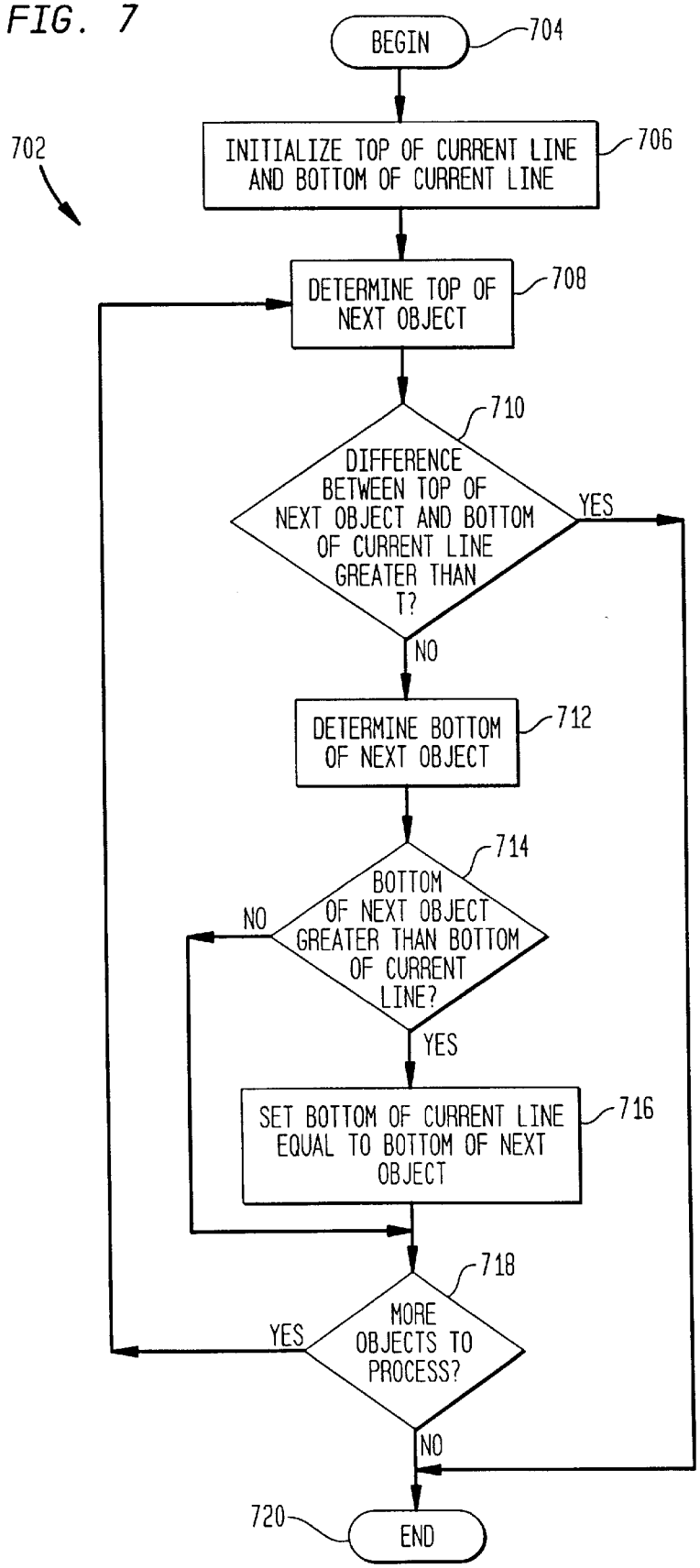

In step 608, the coordinate-to-tag converter 102 identifies all of the records in the sorted coordinate file 506 corresponding to objects in a current line (i.e., the line currently being processed). The coordinate-to-tag converter 102 also determines the top Y-coordinate and the bottom Y-coordinate of this current line. The manner in which the coordinate-to-tag converter 102 performs step 608 is represented by a flowchart 702 in FIG. 7, which shall now be described. Flowchart 702 begins with step 704, where control immediately passes to step 706.

In step 706, the coordinate-to-tag converter 102 initializes a top_of_line value and a bottom_of_line value for the current line based on the {x,y} coordinate of the next unprocessed record (moving from the top of the canvas to the bottom of the canvas) in the sorted coordinate file 506. This next record is called Record N for reference purposes. Assume that this {x,y} coordinate specifies the top left corner of the object corresponding to Record N. In this case, the top_of_line value is set equal to y, and the bottom_of_line value is set equal to y plus the height of the object, which is determined based on information in Record N.

In step 708, the coordinate-to-tag converter 102 determines the top of the next record, i.e., Record N+1.

In step 710, the coordinate-to-tag converter 102 determines whether the record processed in step 708 (i.e., Record N+1) is in the current line. In particular, in step 710 the coordinate-to-tag converter 102 subtracts the Y-coordinate value corresponding to the top of Record N+1 from the bottom_of_line value for the current line. The coordinateto-tag converter 102 then determines whether this difference is greater than a predetermined threshold T. If the difference is greater than T, then the object corresponding to Record N+1 is not in the current line, and control passes to step 720 (representing the end of flowchart 702, i.e., representing the fact that all of the objects in the current line have been identified). If, instead, the difference is not greater than T, then the object corresponding to Record N+1 is in the current line, and control passes to step 712.

Figure 3:
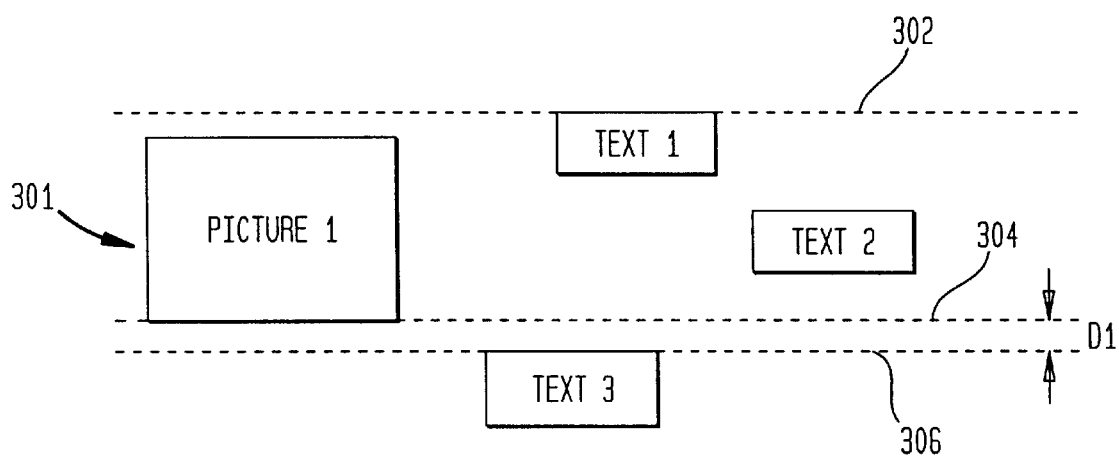
FIGS. 3 and 4 illustrate example canvases used to describe the advantages of the invention.

Step 710 shall now be further described with respect to an example presented in FIG. 3. FIG. 3 illustrates a current line 301 having three objects: Picture 1, Text 1, and Text 2. In step 710, the coordinate-to-tag converter 102 determines whether another object, Text 3, should also be included in the current line 301. The coordinate-to-tag converter 102 does this by subtracting the Y-coordinate value corresponding to the top of object Text 3 (indicated by line 306) from the bottom_of_line value for the current line 301 (indicated by line 304). The coordinate-to-tag converter 102 then determines whether this difference D1 is greater than a predetermined threshold T.

The value of threshold T is implementation dependent. As will be appreciated, if T is greater than or equal to zero, then an object must vertically overlap with at least one object in the current line to be included in the current line. If T is less than zero, then an object need not vertically overlap with any objects in the current line to be included in the current line. The value of T may be software adjustable to allow users the ability to customize the operation of the coordinate-to-tag converter 102 for the characteristics of each document.

In step 712, the coordinate-to-tag converter 102 determines the bottom Y-coordinate for the object corresponding to the record processed in step 708 (i.e., Record N+1).

In step 714, the coordinate-to-tag converter 102 determines whether the bottom Y-coordinate for the object corresponding to Record N+1 is greater than the bottom of the current line (i.e., the bottom_of_line value for the current line). If it is greater, then in step 716 the coordinate-to-tag converter 102 sets the bottom_of_line value for the current line equal to the bottom Y-coordinate for the object corresponding to Record N+1, and then proceeds to step 718. Otherwise, the coordinate-to-tag converter 102 proceeds directly to step 718.

In step 718, the coordinate-to-tag converter 102 determines whether there are any additional records in the sorted coordinate file 506 that have not yet been processed. If there are such unprocessed records, then control returns to step 708. Otherwise, the flowchart 702 is complete, as indicated by step 720.

Referring again to FIG. 6, in step 610 the coordinate-to-tag converter 102 computes the vertical distance value between the current line and the previous line. In other words, the coordinate-to-tag converter 102 subtracts the bottom_of_line value for the previous line from the top_of_line value for the current line. The coordinate-to-tag converter 102 then generates an inter-line tag based on this vertical distance value, and stores this inter-line tag in the next available sequential position of the tag file 508.

The inter-line tag may be a page break, a paragraph break, a line break, etc. These different inter-line tags typically correspond to a different number of vertical units between lines. For example, if a line break tag is written to the tag file 508, then Y vertical units will appear between the previous line and the current line when the contents of the tag file 508 are displayed. In contrast, if a paragraph break tag is written to the tag file 508, then Y+10 vertical units (for example) will appear between the previous line and the current line when the contents of the tag file 508 are displayed. According to the present invention, the coordinate-to-tag converter 102 inserts inter-line tags between lines (as determined in step 608), and determines which particular inter-line tag to generate based on the vertical distance between lines, as described above.

In step 612, the coordinate-to-tag converter 102 sorts the objects in the current line from left to right on the canvas, and stores the coordinate format records corresponding to these sorted objects in a temporary file 510. Thus, the first record stored in the temporary file 510 has the smallest X-coordinate, and the last record stored in the temporary file 510 has the largest X-coordinate.

In step 614, the coordinate-to-tag converter 102 generates one or more ML tags for each record in the temporary file 510 (i.e., in the current line), and sequentially stores these ML tags in the next available positions of the tag file 508. More particularly, the coordinate-to-tag converter 102 reads the next record from the temporary file 510, generates one or more ML tags for this record (the ML tags being equivalent to the record), and sequentially stores these ML tags in the next available locations of the tag file 508. The ML tags may include a tag specifying the informational content of the record, and/or may include intra-line tags (such as font tags, printing tags, etc.). The coordinate-to-tag converter 102 utilizes well known procedures and methods for generating ML tags from the records in the temporary file 510.

In step 616, the coordinate-to-tag converter 102 determines whether there are any more records left in the sorted coordinate file 506 to process. If there are additional records to process, then control flows to step 608. Otherwise, flowchart 602 is complete, as indicated by step 618.

The operation of the coordinate-to-tag converter 102 is further illustrated by pseudo-code and accompanying text contained in the following Appendix to this patent.

Advantages of the Approach of the Invention

As is clear from the above, the invention translates a coordinate based document to a tag (ML) based document by:

(1) Grouping into a line, objects that appear within horizontal boundaries. In particular, objects are grouped within a particular line if they overlap in the vertical dimension on the canvas (this is the case where the threshold T is greater than or equal to zero).

(2) Within a line, objects are ordered from left to right, and any tied objects are ordered from top to bottom.

(3) Layout statements are positioned between lines.

(4) Particular layout statements are determined based on the distance between adjacent lines.

Items (1) and (2) indicate that the present invention orders objects using a line-based algorithm. Items (3) and (4) indicate that the present invention analyzes and defines vertical spacing between objects using a line-based algorithm. There are many advantages for using a line-based algorithm for performing these functions, as shall now be discussed.

Using a line-based algorithm to order objects

To illustrate the advantages of a line-based algorithm for ordering objects, consider an example in which three objects Picture 1, Text 1, and Text 2 are laid out on a canvas as shown in FIG. 3 (for this example, ignore object Text 3). The rectangles in FIG. 3 represent the shortest perimeters that can be drawn around the characters that make up the text of Text 1 and Text 2, and the pixels that make up the image of Picture 1. The line based algorithm of the present invention perceives all of these objects as being part of a single line 301, and so the order of the objects is Picture 1, Text 1, Text 2 because objects within a line are primarily ordered from left to right, and small differences in vertical placement are ignored.

Figure 4:
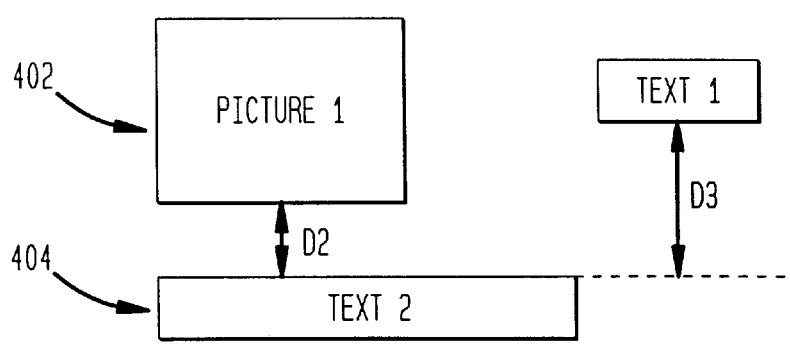

In contrast, a top-to-bottom ordering algorithm will generate an overall object order of Text 1, Picture 1, Text 2 (the top-to-bottom ordering algorithm represents an alternative embodiment of the invention). The difference in the orderings would become apparent when ML generated from the two algorithms was displayed. The display derived from the line-algorithm would show a picture followed by two blocks of text, but the display derived from the top-to-bottom algorithm would show a picture between two blocks of text. The display derived from the line-based algorithm is clearly more faithful to the original layout of objects on the canvas. Using a line-based algorithm for vertical spacing To illustrate the advantages of a line-based algorithm for analyzing the spaces between objects, consider a different layout of the same objects used in the previous example, as shown in FIG. 4. The line-based algorithm perceives 2 lines 402, 404, the first line 402 containing Picture 1 and Text 1, and the second line 404 containing Text 2.

In this configuration, both algorithms generate the same object order. However, a line-based algorithm (which operates according to vertical distance between adjacent lines) and a local-distance algorithm (which operates according to distance between consecutive objects regardless of lines) use different distances to compute what ML layout statement to generate.

A line-based algorithm compares the distance between the bottom of one line and the top of the next line. In the example of FIG. 4, this is the distance D2 between the bottom of Picture 1 and the top of Text 2. In contrast, a local-distance algorithm (which is an alternate embodiment of the invention) compares the distance D3 between consecutive objects that span two lines, i.e., the bottom of Text 1 and the top of Text 2.

Due to the fact that Picture 1 is much taller than Text 1, and Text 1 is positioned approximately centered to Picture 1, the distance between Text 1 and Text 2 cannot be less than a certain value. If this value is more than the difference required to choose between different ML layout statements (between a line break and a paragraph break, for example), then a local-distance based algorithm may incorrectly choose ML layout statements. In contrast, the distance between the first line 402 and the second line 404 is not limited, and so a line-based algorithm is less likely to incorrectly choose ML layout statements.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

An implementation of the invention is described in terms of two procedures, p__Main and p__Line, which refer to other procedures. Pseudo-code for these other procedures is not shown, but their functionality is described. Implementation of these other procedures will be apparent to persons skilled in the relevant art(s) based on the discussion contained herein.
Procedure p__Main is responsible for processing all the objects on a canvas and any intra-line ML. Given a list of objects on a canvas, p__Main calls a second procedure, p__Line, that determines which subset of the list are in a line, and the coordinates of the top and bottom of the line. The coordinates of the current and previous lines are used by a third procedure, p__ML__Layout, to generate any ML that is appropriate to the space. Once this ML has been generated, the subset of the list corresponding to the objects in the current line is resorted from left to right, and then a procedure called p__ML__Object is called to generate the ML__for each object in the line. The counter that tracks the index of the first object in a line is then updated, and the procedure is started over again.

Procedure p__Main
Variables:

L is a list of the objects on a canvas, objects sorted from top to bottom
N is the number of objects in the list L
N1 is the index of the last object in the line
I is a counter indicating the index of the first component in the current line
J is a counter indicating the index of the current component in the current line
Y0 is the coordinate of the bottom of the previous line
Y1 is the coordinate of the top of the current line
Y2 is the coordinate of the bottom of the current line
D is the distance between the current line and the previous line
Input to Procedure p__Main is L
/* Initialization */
I = 1
Y0 = 0
/* do until we reach the end of the list of components */
Until I > N, do the following:
    /* obtain the coordinates of the top and bottom of the
    current line */
    * and the index of the last object in the line */
    Call p__Line( I, L, N ) -> N1, Y1, Y2
    /* compute the distance between the current line and
    the previous */
    /* and call a function to generate any necessary ML */
    Call p__ML__Layout ( Y0, Y1 )
    /* sort the objects in the current line from left to
    right */
    Call p__Left__To__Right ( I, N1, L
    /* in turn for each object in the current line, call
    a procedure to */
    /* generate the ML corresponding to the object */
    J = I
    Until J > N1, do the following
    Call p__ML__Object ( J )
    J = J + 1
    End Until
    /* update the counter to point to the object in the
    list immediately */
    /* after the last object in the current line */
    I = N1 + 1
    Y0 = Y2
End Until
End Procedure
Procedure p__Line is responsible for determining which objects are grouped into a line, and for determining the coordinates of the top and bottom of the line. Objects are grouped into a line if they overlap in the vertical dimension (when T is greater than or equal to zero). The procedure assumes that it is operating on a list of objects, L, starting with the Kth item on the list, and the order of the items in the list corresponds to their vertical order, from top to bottom, on the canvas. The procedure starts by assigning the upper and lower coordinates of the first object to be the coordinates of the top and bottom of the line (Y1 and Y2 respectively) It then determines the top of the second object (Y3). If the top of the second object is between the top and bottom of the first object, and the first object is not the last object in the list, then we enter a loop to test subsequent objects. In particular, this means testing whether the bottom of the next object is below the current value assigned to the bottom of the line. If this is true then the coordinate value of the bottom of the next component is assigned to the coordinate representing the bottom of the line. The body of the loop is completed by updating the counter for the current component, and determining the coordinate value of the top of the next object.

-continued

```
Procedure p_Line
Variables:
L is a list of the objects on a canvas, objects sorted from
top to bottom
K is the index of the start list item
N is the number of items in the list L
I is a counter indicating index of current object in L
Y1 is the coordinate of the top of the line
Y2 is the coordinate of the bottom of the line
Y3 is the coordinate of the top of the next object
Y4 is the coordinate of the bottom of the next object
T is the maximum distance allowed between two objects in
the same line
Inputs to Procedure p_Line are K, L and N
Outputs of Procedure p_Line are I, Y1, Y2
/* Initialization */
Y1 = p_Object_Top ( K )
Y2 = p_Object_Bottom ( K )
I = K
Y3 = p_Object_Top ( I + 1)
Until ((Y2 − Y3) < T) Or (I = N), do the following:
    Y4 = p_Object_Bottom( I + 1 )
    If Y4 > Y2 Then Y2 = Y4
    I = I + 1
    Y3 = p_Object_Top( I + 1 )
End Until
Return I, Y1, Y2
End of Procedure
```

Having thus described our invention, what we claim as new and desire to secure by Letters Patent is:

1. A method of converting an electronic representation of a coordinate based document to an electronic representation of a tag based document, comprising the steps of:
   (1) identifying objects, defined by records stored in said electronic representation of said coordinate based document, that are positioned in a current line;
   (2) sorting said identified objects based on respective horizontal positions of said identified objects in an electronic canvas;
   (3) calculating a vertical distance between said current line and an adjacent line;
   (4) generating an inter-line tag as a function of said distance; and
   (5) storing said inter-line tag in said electronic representation of said tag based document.

2. The method of claim 1, wherein in step (2) said identified objects are sorted from left to right.

3. The method of claim 1, wherein in step (5) said inter-line tag is stored in a next available location of said electronic representation of said tag based document.

4. The method of claim 1, further comprising the following step that is performed before step (1):
   (6) sorting objects, defined by records stored in said electronic representation of said coordinate based document, based on their respective vertical positions in said electronic canvas.

5. The method of claim 4, wherein in step (6) said objects are sorted from top to bottom.

6. The method of claim 1, wherein step (1) comprises the steps of:
   selecting an object defined by a record stored in said electronic representation of said coordinate based document;
   determining whether said selected object vertically overlaps any object previously determined to be positioned in said current line; and
   determining that said selected object is in said current line if said selected object vertically overlaps any object previously determined to be positioned in said current line.

7. The method of claim 1, further comprising the steps of:
   (6) generating one or more intra-line tags for each of said sorted identified objects; and
   (7) storing said intra-line tags in said electronic representation of said tag based document.

8. The method of claim 7, wherein in step (7) said tags are sequentially stored in consecutive, available locations of said electronic representation of said tag based document.

9. A coordinate-to-tag converter for converting an electronic representation of a coordinate based document to an electronic representation of a tag based document, comprising:
   object identifying means for identifying objects, defined by records stored in said electronic representation of said coordinate based document, that are positioned in a current line;
   horizontal sorting means for sorting said identified objects based on respective horizontal positions of said identified objects in an electronic canvas;
   distance calculating means for calculating a vertical distance between said current line and an adjacent line;
   inter-line generating means for generating an inter-line tag as a function of said distance; and
   inter-line storing means for storing said inter-line tag in said electronic representation of said tag based document.

10. The coordinate-to-tag converter of claim 9, wherein said horizontal sorting means sorts said identified objects from left to right.

11. The coordinate-to-tag converter of claim 9, wherein said inter-line storing means stores said inter-line tag in a next available location of said electronic representation of said tag based document.

12. The coordinate-to-tag converter of claim 9, further comprising:
   vertical sorting means for sorting objects, defined by records stored in said electronic representation of said coordinate based document, based on their respective vertical positions in said electronic canvas.

13. The coordinate-to-tag converter of claim 12, wherein said vertical sorting means sorts said objects from top to bottom.

14. The coordinate-to-tag converter of claim 9, wherein said object identifying means comprises:
   means for selecting an object defined by a record stored in said electronic representation of said coordinate based document;
   means for determining whether said selected object vertically overlaps any object previously determined to be positioned in said current line; and
   means for determining that said selected object is in said current line if said selected object vertically overlaps any object previously determined to be positioned in said current line.

15. The coordinate-to-tag converter of claim 9, further comprising:
   means for generating one or more intra-line tags for each of said sorted identified objects; and
   intra-line tag storing means for storing said intra-line tags in said electronic representation of said tag based document.

16. The coordinate-to-tag converter of claim 15, wherein said intra-line tag storing means sequentially stores said intra-line tags in consecutive, available locations of said electronic representation of said tag based document.

* * * * *